(12) United States Patent
Kawamichi et al.

(10) Patent No.: US 6,886,039 B1
(45) Date of Patent: Apr. 26, 2005

(54) ADAPTIVE COMMUNICATION METHOD

(75) Inventors: Hiroaki Kawamichi, Yokohama (JP); Shigetoshi Sameshima, Machida (JP); Katsumi Kawano, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 644 days.

(21) Appl. No.: 09/643,758

(22) Filed: Aug. 23, 2000

(30) Foreign Application Priority Data

Nov. 12, 1999 (JP) .......................................... 11-322117

(51) Int. Cl.[7] .......................................... G06F 15/173
(52) U.S. Cl. ..................................... 709/224; 340/506
(58) Field of Search .............................. 709/224, 230; 340/506; 714/25; 702/177, 182, 188; 706/55

(56) References Cited

U.S. PATENT DOCUMENTS

| | | | | |
|---|---|---|---|---|
| 6,122,603 A | * | 9/2000 | Budike, Jr. ................. | 702/182 |
| 6,370,582 B1 | * | 4/2002 | Lim et al. ................... | 709/230 |
| 6,396,534 B1 | * | 5/2002 | Mahler et al. .............. | 348/155 |
| 6,421,630 B1 | * | 7/2002 | Yamada et al. ............. | 702/177 |
| 6,499,114 B1 | * | 12/2002 | Almstead et al. ............ | 714/25 |
| 6,553,336 B1 | * | 4/2003 | Johnson et al. ............. | 702/188 |
| 6,553,418 B1 | * | 4/2003 | Collins et al. .............. | 709/224 |
| 6,591,296 B1 | * | 7/2003 | Ghanime ..................... | 709/224 |
| 6,618,716 B1 | * | 9/2003 | Horvitz ........................ | 706/55 |
| 6,714,977 B1 | * | 3/2004 | Fowler et al. .............. | 709/224 |
| 6,717,513 B1 | * | 4/2004 | Sandelman et al. ......... | 340/506 |
| 2003/0098789 A1 | * | 5/2003 | Murakami et al. .......... | 340/506 |

FOREIGN PATENT DOCUMENTS

JP  8-137697  5/1996

* cited by examiner

Primary Examiner—John Follansbee
Assistant Examiner—Jungwon Chang
(74) Attorney, Agent, or Firm—Mattingly, Stanger, Malur & Brundidge, P.C.

(57) ABSTRACT

In a distributed system having a plurality of equipment that are interconnected over transmission medium and that include one or more arithmetic units, any of the plurality of equipment notifies a person to be notified about a function of the any of the equipment in accordance with an adaptive communication method in which the notification method is determined by the following steps. A first step that any of the plurality of equipment obtains environment information of that equipment and another equipment if necessary and a second step that any of the equipment determines the notification method depending on the environment information obtained by the first step and a contents of information concerning the function of any of the equipment.

6 Claims, 12 Drawing Sheets

| 31 | GOODS ID | 0123456789 |
|---|---|---|
| 32 | PRICE | 100 |
| 33 | EFFECTIVE PERIOD | -/1999-12-30 |
| 34 | STANDARD PRICE | 120 |
| 35 | CONSIGNMENT ACHIEVEMENTS | 100 |

| | | |
|---|---|---|
| 41 | GOODS ID | 0123456789 |
| 42 | PRICE | 100 |
| 43 | EFFECTIVE PERIOD | -/1999-12-30 |
| 44 | STANDARD PRICE | 120 |

ADAPTIVE COMMUNICATION METHOD

BACKGROUND OF THE INVENTION

1. Field of the Invention

The present invention relates to a method of notifying information according to environment information and the contents of notification which is implemented in a distributed system consisting of a plurality of pieces of equipment including one or more arithmetic units. Specifically, a system manager sets a condition for information presentation in equipment in advance or a user sets the condition for information notification in equipment. When the condition is met, information is presented to a notified person.

2. Description of the Related Art

According to the present invention, a condition for information presentation or a condition for information notification is set in equipment in order to assign processing to equipment. Conventional methods of assigning processing implemented in a distributed system include a method described in, for example, Japanese Unexamined Patent Publication No. 8-137697. According to the method, a distributed system includes a plurality of agents for carrying out tasks.

The agent has the knowledge relevant to its own ability and others' abilities to carry out a task, and determines assigned processing through negotiations. Furthermore, the agent detects a change in the characteristics of a system from the results of processing and modifies its own knowledge. Owing to this technique, processing can be assigned based on a change in a system without the necessity of maintenance.

SUMMARY OF THE INVENTION

In the foregoing conventional distributed system, the agent infers a situation only after executing a task. Unless the agent grasps a situation accurately, processing may be assigned undesirably. Furthermore, after processing is assigned, if an environment of the agent changes, processing being executed does not make sense. A system manager or a user must determine settings necessary for assignment of processing again. This poses a problem.

Furthermore, in some distributed systems, the number of components is very large, and addition or separation of a component takes place all the time. In this case, it is very difficult to limit an information presenting means, which presents information to a user after processing is assigned, to one specific means. The information presenting means must be changed from one to another according to a component used to present information. According to the technique that has been proposed in the past, a system manager or a user must determine settings according to a change of components used to notify information. This poses a problem.

The present invention attempts to break through the foregoing situation. An object of the present invention is to avoid execution of unnecessary processing so as to reduce a processing load incurred by an arithmetic unit and the necessity of re-setting a condition. Specifically, according to the present invention, a change in environment information is detected even during execution of processing, and a way of information presentation is changed based on the change or information presentation is suspended. Moreover, an information presenting means is provided in line with a component used to present information.

For accomplishing the above object, according to the present invention, even when processing is being executed under a condition for information presentation set by a system manager or a user-specified condition for information notification, environment information of an environment surrounding a system for which the condition for information notification is set can be acquired. Information is then notified based on the acquired information. What is referred to as environment information is information concerning an environment, in which the system and/or equipment is installed, including a situation in which a user confronts. The environment information affects a way of information presentation according to which equipment is used to present information to a notified person.

Absolute or relative time is acquired as the environment information of an environment surrounding the system for which the condition for information notification is set. What is referred to as time information is information representing a time or a time instant and including a scheduled processing end time instant or a processing time.

Change information that indicates addition or separation of equipment to be accommodated in a network within a distributed system is acquired. Otherwise, information concerning a notified person is acquired. The information concerning a notified person includes information with which a notified person is identified, location information indicating the location of a notified person, or an attention level or an object of attention to which a notified person is attracted attention. Otherwise, ambient information of equipment is acquired. The ambient information includes information of equipment which can be detected using a sensor by the equipment forming the distributed system. Otherwise, the contents or amount of presented information is acquired as the environment information. Otherwise, an information notification destination is acquired as the environment information.

Since the foregoing information is acquired, if it is judged that the necessity of notifying information is nullified, information notification is suspended. Otherwise, since the foregoing information is acquired, if it is revealed that a notified person has moved, an information notification destination or a range of information notification is changed. Otherwise, an information representing means is selected based on the information notification destination, so that a user can be notified of information properly. Otherwise, when the environment information based on which the condition for information presentation or the condition for information notification is determined is changed, the condition is changed. Otherwise, since the foregoing information is acquired, if information required by a notified person is changed, the contents of information to be presented to the notified person are changed.

Since the foregoing information is acquired, if the importance of information required by a notified person is presumably changed, a priority given to processing to be performed for notifying the notified person of information or the frequency of executing information presentation for presenting information to the notified person is changed. Furthermore, selection of an information presenting means or split of presented information is performed based on the contents or amount of notified information.

The above processing is carried out without interference of a system manager or user during execution of another processing. Presentation of unnecessary information can be avoided, and information can be presented more efficiently. Furthermore, information can be presented to a notified person properly according to a situation.

DESCRIPTION OF THE PREFERRED EMBODIMENTS

An embodiment of the present invention will be detailed below in conjunction with the drawings.

Figure 13:
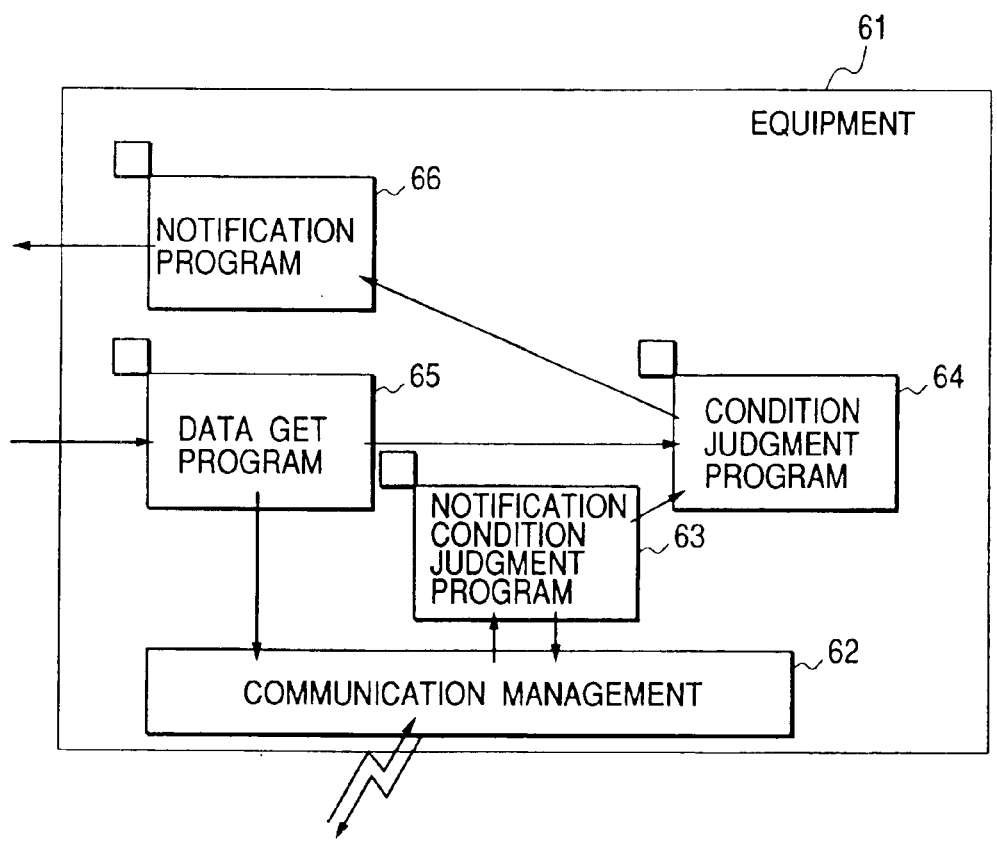
FIG. 13 shows the configuration of an information notification facility of equipment for notifying a notified person of information according to the present invention.

FIG. 13 shows the configuration of a notification facility of equipment in accordance with the present invention. Equipment 61 is included in a system that is required to implement the present invention and that accommodates equipment in a distributed manner. The equipment 61 has a communication management unit 62 enabling one piece of equipment to communicate with another. The communication management unit 62 transmits or receives information. A notification possibility judgment program 63, a condition judgment program 64, a data acquisition program 65, and a notification program 66 are installed in the equipment 61. The notification possibility judgment program 63 judges whether the equipment 61 can notify information. The condition judgment program 64 judges whether a condition for notification is met. The data acquisition program 65 acquires information. The notification program 66 notifies a notified person of information.

Figure 14:
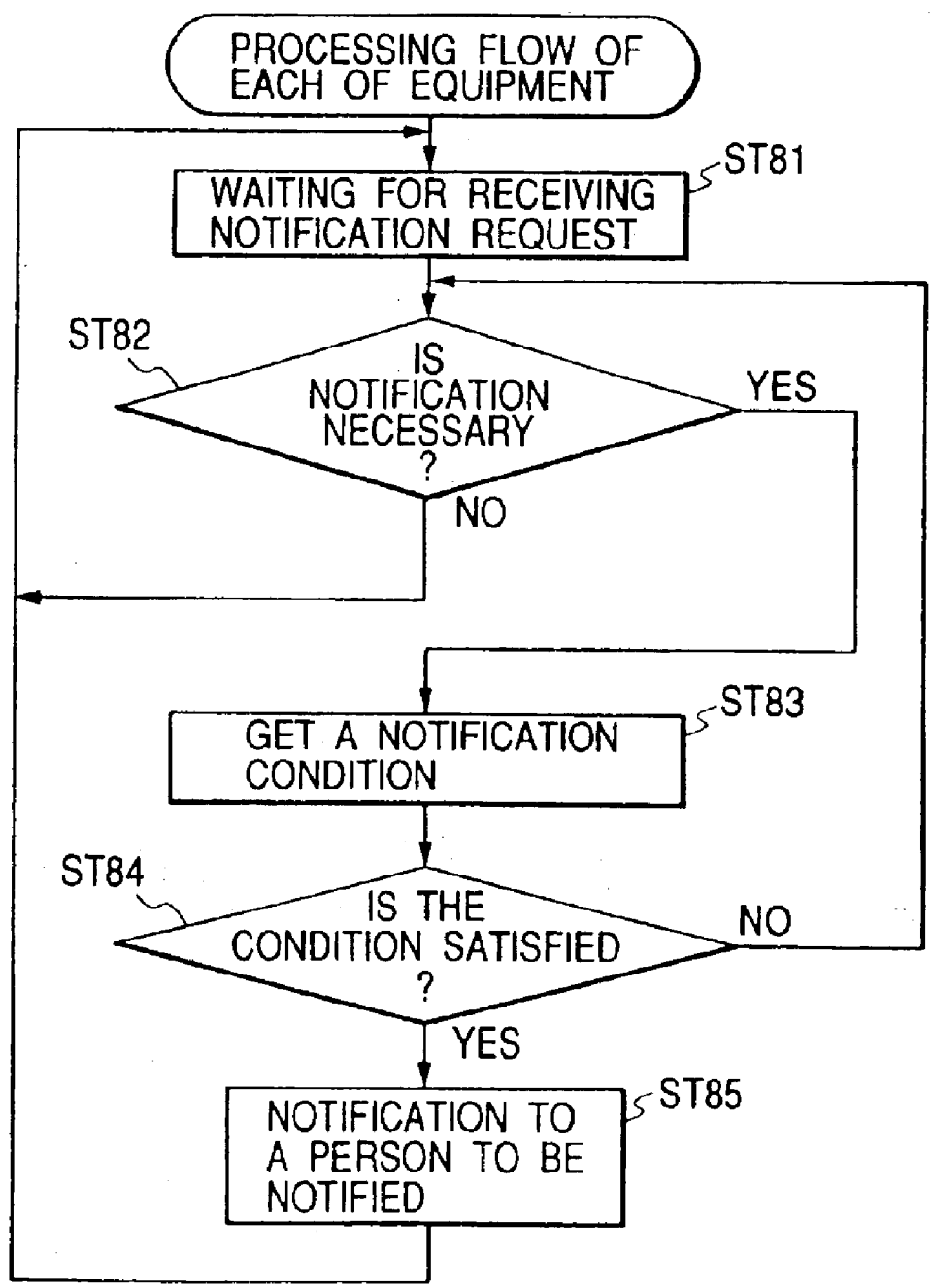
FIG. 14 is a flowchart describing notification of a notified person of information, which depends on a piece of equipment, in accordance with the present invention.

FIG. 14 describes a flow of notifying a notified person of information which is performed by the equipment 61. First, at step ST81, the equipment 61 stands by until it receives a notification request. When the communication management unit 62 receives a notification request, control is passed to step ST82. The notification possibility judgment program 63 judges at step ST82 whether information should be notified.

For example, it is judged from location information of a notified person whether the equipment is suitable for notification. Assuming that the notified person is attracted attention to his/her own equipment, it is judged that the equipment 61 can be used to notify information. When it says that the notified person is attached attention to his/her own machine, it means that if the equipment includes a television, the television is switched on and the notified person is watching television for a certain period of time or longer. If it is judged at step ST82 that information can be notified, control is passed to step ST83. Otherwise, control is passed to step ST81, and the standby state is retained until a notification request is received. At step ST83, the data acquisition program 65 acquires information relevant to the processing.

If information provided by a sensor included in the own equipment is needed to judge whether notification should be performed, the data acquisition program acquires the information. If another information is needed, the data acquisition program uses the communication management unit 62 to issue an information transmission request to another piece of equipment, and acquires information. Herein, all pieces of equipment may transmit information at regular intervals, and receiving equipment may acquire necessary information. Control is then passed to step ST84. The condition judgement program 64 judges whether a condition for notification is met. The condition for notification may be set based on information acquired when a notification request is received at step ST81. The condition for notification is a pre-set condition. Information used for judgment at step ST84 is information acquired at step ST83, for example, an amount of hot water in a bathtub. If it is judged at step ST84 that the condition is met, control is passed to step ST85. Otherwise, a standby state is retained for a certain period of time, and control is then returned to step ST82. The notification program 66 notifies a notified person of information at step ST85.

For example, when the equipment 61 includes a television, information is notified as image information. Assuming that the equipment 61 includes an audio player, information is notified as voice information. At this time, information provision that has already been started may be suspended in order to present the information or the information may be presented concurrently with information provision. Examples in which the present invention is implemented will be described below.

FIRST EXAMPLE

Figure 1:
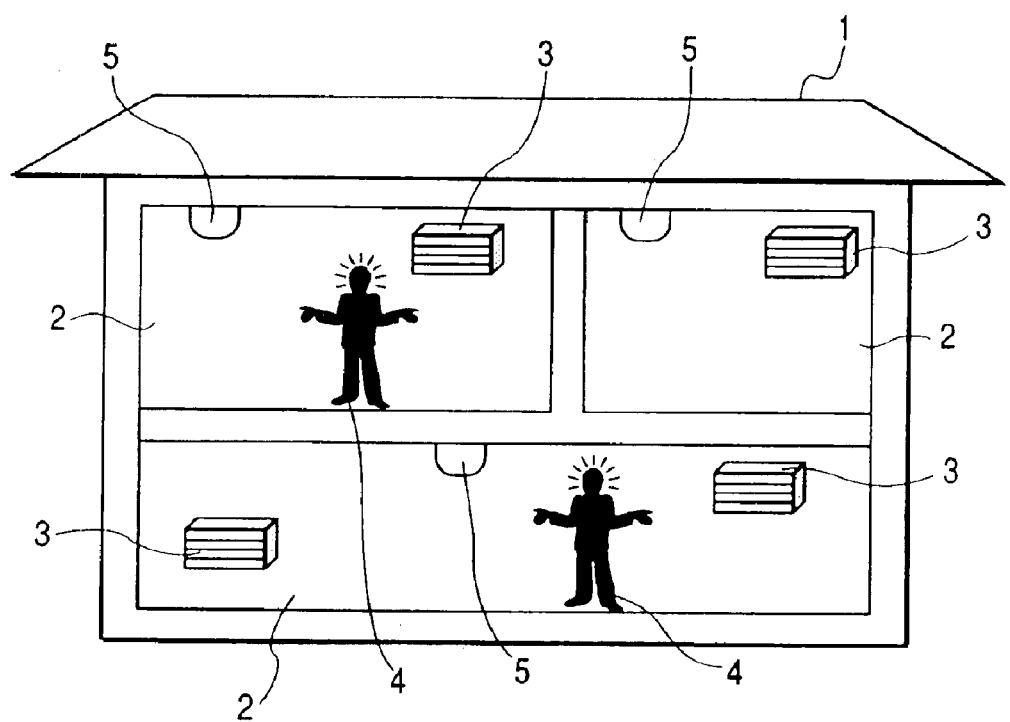
FIG. 1 schematically shows an example in which an adaptive communication method in accordance with the present invention is implemented in home automation.

FIG. 1 schematically shows an example in which the adaptive communication method in accordance with the present invention is implemented in home automation. A house 1 consists of one or more rooms 2. A group address is assigned to equipment 3 installed in each room 2. The equipment 3 may include, for example, a lighting, an air conditioner, a refrigerator, a game machine, a printer, a personal computer, a telephone, an audio player, and a television. All the pieces of equipment 3 having the same group address are interconnected over a transmission medium. The transmission medium may be radiocommunication, the Ethernet, or a combination of a plurality of transmission media. An instruction is transmitted externally to the equipment 3 over the transmission medium in order to change a condition set the equipment 3. For example, when the equipment 3 includes an air conditioner, the on or off state of the air conditioner, a set temperature, an operation mode such as a cooler mode or a heater mode, a magnitude of a breeze, a time set for a timer, and others can be set externally over the communication medium. When the equipment 3 includes a television, the on or off state of the television, a volume, a channel, a time set for a timer, and others can be set externally over the transmission medium. The settings for the equipment 3 are determined based on a user's action. A sensor 5 installed in each room 2 detects in which room a user 4 stays. The sensor 5 may include, for example, a CCD camera for imaging the interior of a room, and detect the user 4 according to the user's biomedical features through image processing. Alternatively, the sensor 5 may receive information of the user 4 originated from an apparatus worn by the user 4, and detect the user 4 staying in a room 2.

Figure 2:
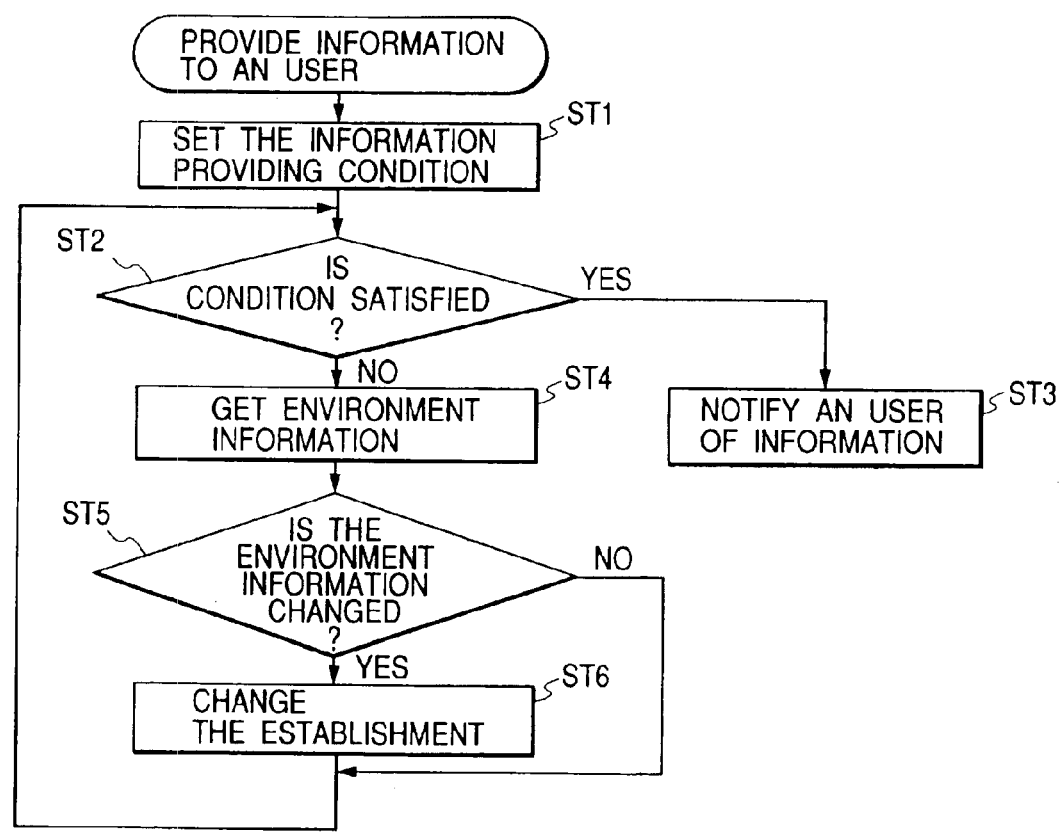
FIG. 2 is a flowchart describing information notification to be performed under a user-specified condition within home automation.

FIG. 2 describes a flow of processing included in the adaptive communication method in accordance with the present invention. Assuming that the user 4 wants to acquire certain information. A condition for information presentation is set at step ST1. For example, when the user 4 wants to pour hot water into a bathtub, the user 4 can determine a setting so that when the level of hot water has come to be 15 cm below the top of the bathtub, the user will be notified of the fact. Moreover, the user 4 can also set a target time instant by which hot water has been poured into the bathtub. Setting the condition may be achieved using a personal computer or using a bathtub management system. Set information is held in, for example, the bathtub management system. Alternatively, the set information may be held in the equipment 3 used to notify the user 4 of information.

A system manager may predefine the setting of the condition for information presentation. For example, an alarm message may be transmitted when the temperature of hot water in a bathtub exceeds 50° C. It is judged at step ST2 whether the results of processing being executed meet the condition set at step ST1. If it is judged at step ST2 that the request of processing meet the condition, control is passed to step ST3. At step ST3, a user is notified of information. For notifying the user 4 of information, for example, an audio player may be used to notify the user 4 with voice. Otherwise, the user 4 may be notified with flickering of light emanating from a lighting or by displaying characters using a personal computer or the like that has a display device. In this case, an information presenting means may be changed according to an amount or the contents of presented information. Otherwise, presented information may be split. For example, an amount of hot water may reach a set value but the temperature of hot water may exceed 50° C. In this case, the presented information may be split, so that the amount of hot water can be presented as character information and the temperature can be presented as an alarm given with a voice. Alternatively, the alarm may be given with a voice message in order to attract a notified person's attention. The character information may be presented using a display device. If it is judged at step ST2 that the results of processing do not meet the condition, control is passed to step ST4. Environment information is then acquired.

Figure 3:
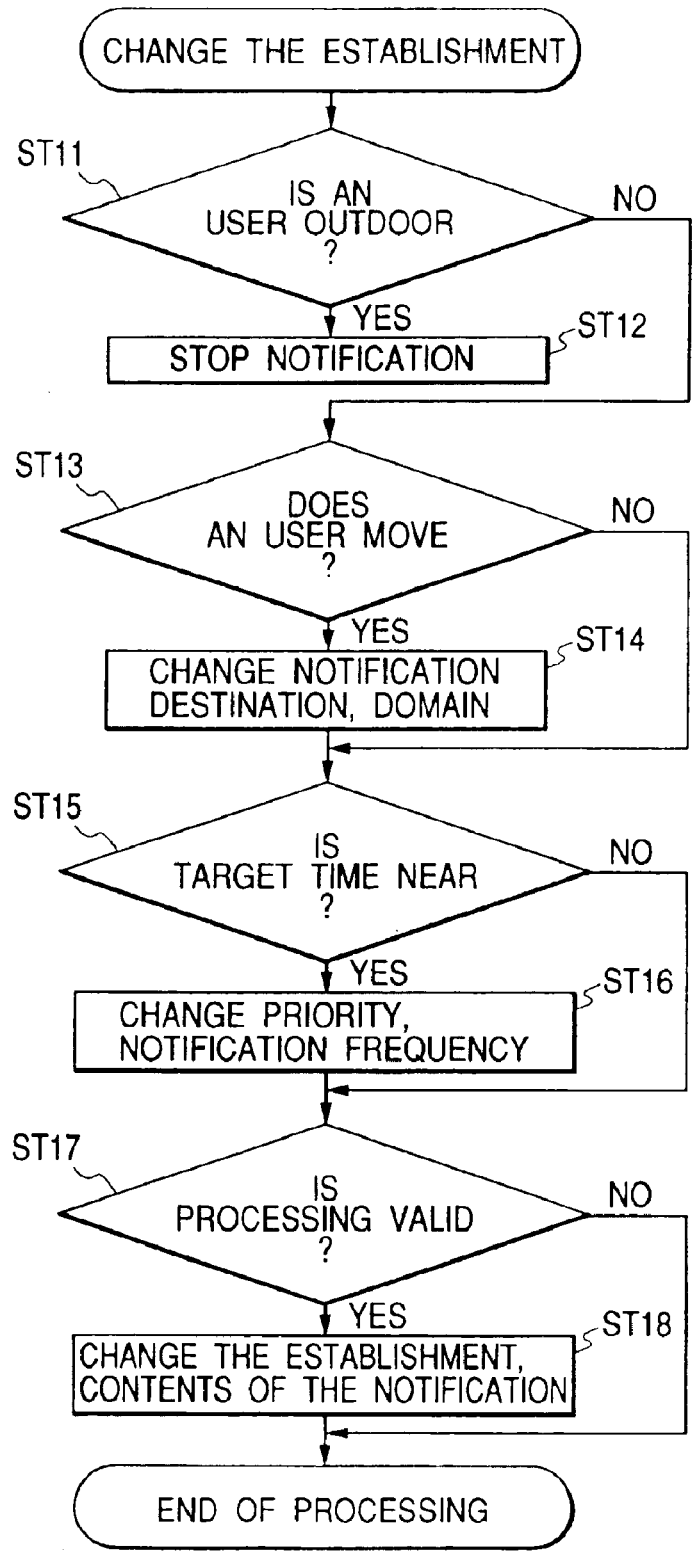
FIG. 3 is a flowchart describing changing of information notification according to environment information within home automation.

When it says that environment information is acquired, it means that a current place (room) where the user 4 stays, an action of the user 4, the active or inactive state of equipment, an outdoor temperature, outdoor weather, a target processing end time instant, absolute time information, and others are acquired. Herein, the action of the user 4 includes an action of switching on an audio player or a television. After environment information is acquired at step ST4, control is passed to step ST5. It is then judged whether environment information has been changed. If environment information has not been changed, control is returned to step ST2. If environment information has been changed, control is passed to step ST6. The settings are then changed. Changing the settings performed at step ST6 is detailed in the flowchart of FIG. 3. First, it is judged at step ST11 whether the user 4 stays outdoors. When it is judged that the user 4 does not stay in any of the rooms 2, it is judged that the user says outdoors.

A sensor may be installed in the hall, whereby it may be judged whether the user 4 has passed the hall. It may be judged from the results of judgment whether the user 4 stays outdoors. Assuming that the user 4 stays outdoors from seven o'clock to ten o'clock in the morning, it is judged that the user 4 has gone to a company or school, and it is regarded that the necessity of notifying the user 4 of information is obviated. Control is then passed to step ST12, and information notification is suspended. If it is judged at step ST11 that the user 4 stays indoors, control is passed to step ST13. It is then judged whether the user 4 has moved. Herein, if a room wherein the user 4 stays is different from the results of previous measurement performed using the sensor 5 installed in each room 2, the user 4 is judged to have moved from one room to another. In any other case, it is judged that the user 4 has not moved from one room to another. Alternatively, a sensor may be mounted on a door or any other partition between rooms in order to detect passage. When the sensor detects passage of the user 4, it may be judged that the user 4 has moved. Otherwise, it may be judged that the user 4 has not moved. If it is judged that the user has moved, control is passed to step ST14. The equipment 3 to be used to notify the user 4 of information is determined based on a room where the user 4 currently stays, so that the user 4 will be notified of information reliably. Furthermore, the user 4 is notified of information according to the characteristic of the equipment 3.

For example, if the equipment 3 includes an audio player, notification is achieved with voice. If the equipment 3 includes a personal computer having a display device, notification is achieved with characters. If the equipment 3 includes a lighting, notification is achieved with flickering of light. Information concerning an attention level at which the user 4 is attracted attention or an object of attention to which the user 4 is attracted attention may be acquired. When the attention level is low, the user 4 may be notified using an object of attention with a sound of a large volume. Otherwise, information may be notified according to a way of notification pre-set by the user 4. Otherwise, a current time instant may be acquired. If it is nine o'clock or later in the evening, notification with voice may not be carried out. Otherwise, if highly urgent information, for example, leakage of a gas must be notified, all pieces of equipment existent around the user 4 may be used. After the settings are changed, control is passed to step ST15. If it is judged at step ST13 that the user 4 has not moved, control is passed to step ST15. At step ST15, a current time instant is acquired and a difference of the current time instant from a target time instant at which, for example, a bath is ready with hot water poured into a bathtub is calculated in order to judge whether the target time instant comes soon.

For example, when it is less than ten minutes before the target time instant, it is judged that the target time instant comes soon. If it is judged that the target time instant comes soon, control is passed to step ST16. A priority given to information presentation is changed. For example, when the priority is ranked in seven levels, a priority of level 4 may be changed into a priority of level 2. Information presentation may thus be carried out with a higher priority. Alternatively, the frequency of information presentation may be changed. For example, when it is set that information is presented at intervals of five minutes, the setting may be changed so that information will be presented at intervals of two minutes. This processing is achieved when it is necessary to notify a user of a progress.

The progress to be notified is, for example, the progress of pouring hot water in a bathtub. Specifically, the current amount of hot water in a bathtub is notified in the course of pouring hot water. Thereafter, control is passed to step ST17.

If it is judged at step ST15 that the target time instant does not come soon, control is passed to step ST17. It is judged at step ST17 whether processing is appropriate. For example, when it is judged from the current time instant that it is early in the morning or it is midnight, hot water must be poured quietly. If a pouring rate of hot water exceeds a half of a pouring rate at which hot water is poured normally, processing is judged to be inappropriate. If it is judged at step ST17 that processing is inappropriate, a setting determined for the processing is changed at step ST18. Changing a setting means, for example, that the pouring rate is changed to a half of the pouring rate at which hot water is poured normally. Along with the changing of the setting determined for processing, the condition for notification may be changed. For example, when the condition for notification is set so that the level of hot water in a bathtub is 15 cm below the top of the bathtub, the setting is changed so that notification will be performed when the level of hot water has come to be 20 cm below the top of the bathtub. Furthermore, the contents of information to be notified the user 4 may also be changed. For example, the fact that a set condition has been changed is notified with a message saying "Set condition has been changed, that is, an amount of hot water has been changed. Now, the level of hot water in a bathtub is 20 cm below the top of the bathtub." Thereafter, the processing is terminated. Moreover, if it is judged at step ST17 that processing is appropriate, the processing is terminated.

SECOND EXAMPLE

Figures 4, 5:
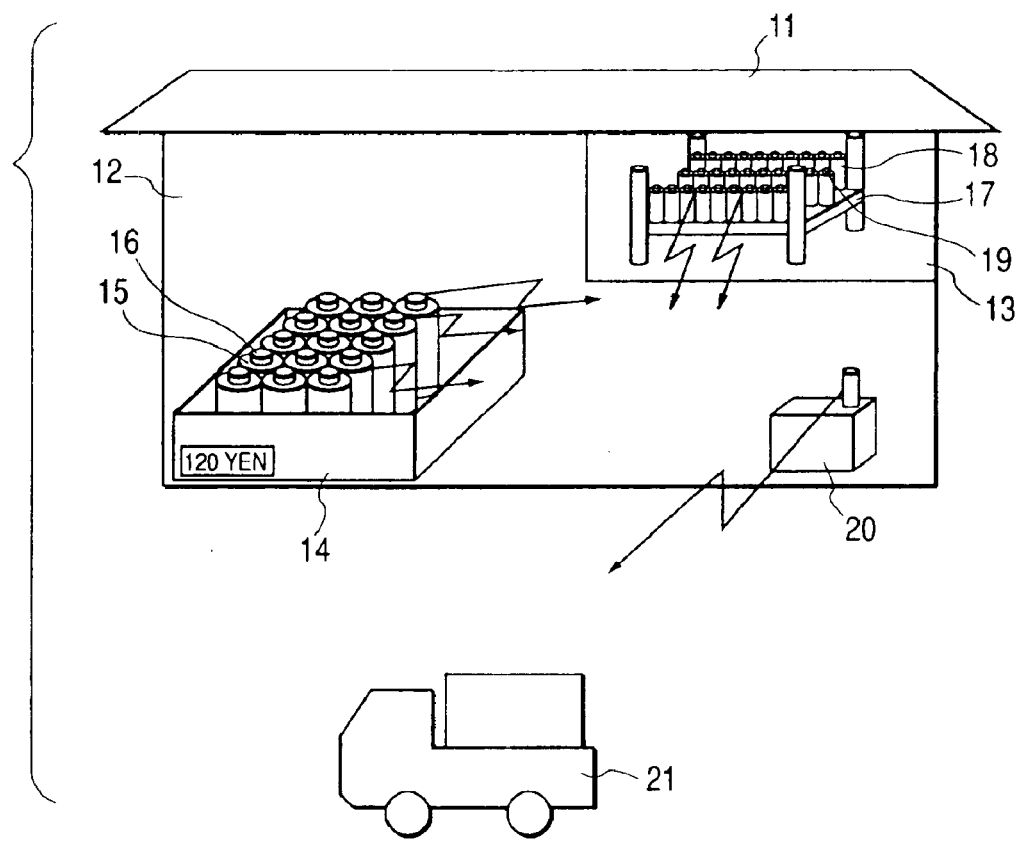
FIG. 4 schematically shows an example in which the adaptive communication method in accordance with the present invention is implemented in an inventory management system.
FIG. 5 shows the structure of a table held in an IC tag borne by commodities placed in a showcase.

FIG. 4 schematically shows an example in which the adaptive communication method in accordance with the present invention is implemented in an inventory management system. The inventory management system is used to manage an inventory of commodities to be sold at a retail shop 11. The retail shop 11 has a selling space 12 and a warehouse 13. A showcase 14 is installed in the selling space 12. The names and prices of commodities 15 to be displayed in the showcase 14 may be presented. The commodities 15 to be sold to shoppers are arranged in the showcase 14. The commodities 15 each bear an IC tag 16 in which price information or the like is held. FIG. 5 shows information held in the IC tag 16. Namely, a commodity identification number (ID) 31, a price 32, an effective period 33, a standard price 34, and sales results 35 are held in the IC tag 16. The commodity identification number 31 indicates the type of commodity 15. The price 32 indicates an actual selling price of a commodity 15 that is different among retail shops. The effective period 33 indicates a period during which the price 32 is effective. The standard price 34 indicates a desired retail price. The sales results indicate the sales volume of commodities 15 sold during a certain period, for example, one past day.

Figures 6, 7:
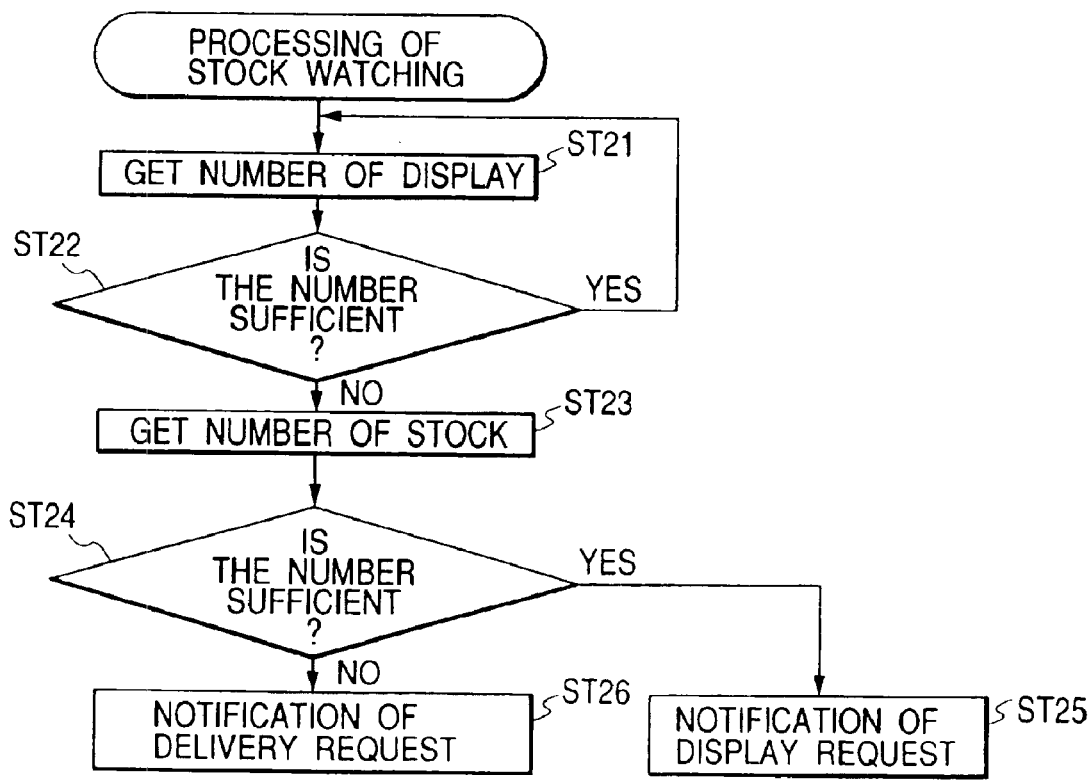
FIG. 6 shows the structure of a table held in an IC tag borne by commodities preserved in a warehouse.
FIG. 7 is a flowchart describing inventory monitoring performed by the inventory management system.

The effective period 33 is used to indicate a period during which a time-limit sales is under way. The effective period 33 is specified with a start time instant and an end time instant. The start time instant and end time instant may not be specified. When the start time instant is not specified, as soon as the price 32 is determined, the price 32 becomes effective. When the end time instant is not specified, the price 32 will remain effective ever since. Shelves 17 on which commodities are kept in stock are installed in the warehouse 13. Commodities 18 are kept in stock on the shelves 17, and each bear an IC tag 19. Information shown in FIG. 6 is held in the IC tag 19. Specifically, a commodity identification number 41, a price 42, an effective period 43, and a standard price 44 are held in the IC tag 19. The commodity identification number 41 indicates the type of commodity 18. The price 42 indicates an actual selling price of the commodity 18. The effective period 43 indicates a period during which the price 42 is effective. The standard price 44 indicates a desired retail price. The IC tag 16 and IC tag 19 transmit current inventory information and notify a driver of a delivery truck 21 of information via equipment 20.

FIG. 7 describes a flow of inventory monitoring included in the adaptive communication method in accordance with the present invention that is implemented in the inventory management system. A manager of the overall system may predefine a condition for monitoring, or a proprietor of each shop may define it in a due course. First, the quantity of commodities 15 in the showcase 14 is acquired at step ST21. The quantity may be managed using a cash register. Alternatively, a presence message to be transmitted periodically from the IC tag 16 may be utilized. It is then judged at step ST22 whether the quantity of displayed commodities is sufficient. For example, when the quantity of displayed commodities is ten pieces or less, it is judged that the quantity of displayed commodities is insufficient. Control is then passed to step ST23. If the quantity of displayed commodities is judged to be sufficient, a standby state is retained for a certain period of time. Thereafter, control is returned to step ST21. The inventory of commodities 18 kept in the warehouse 13 is acquired at step ST23. The inventory may be managed using the cash register. Alternatively, the presence message to be transmitted periodically from the IC tag 19 may be utilized. Control is then passed to step ST24. It is then judged whether the inventory is sufficient.

For example, when the inventory is too small to fill one casing, the inventory is judged to be insufficient. Control is then passed to step ST26. A delivery request is issued to the delivery truck 21. If the inventory is judged to be sufficient, control is passed to step ST25. A salesperson in the retail shop 1 is instructed to replenish the showcase 14 with the commodities 15.

Figure 8:
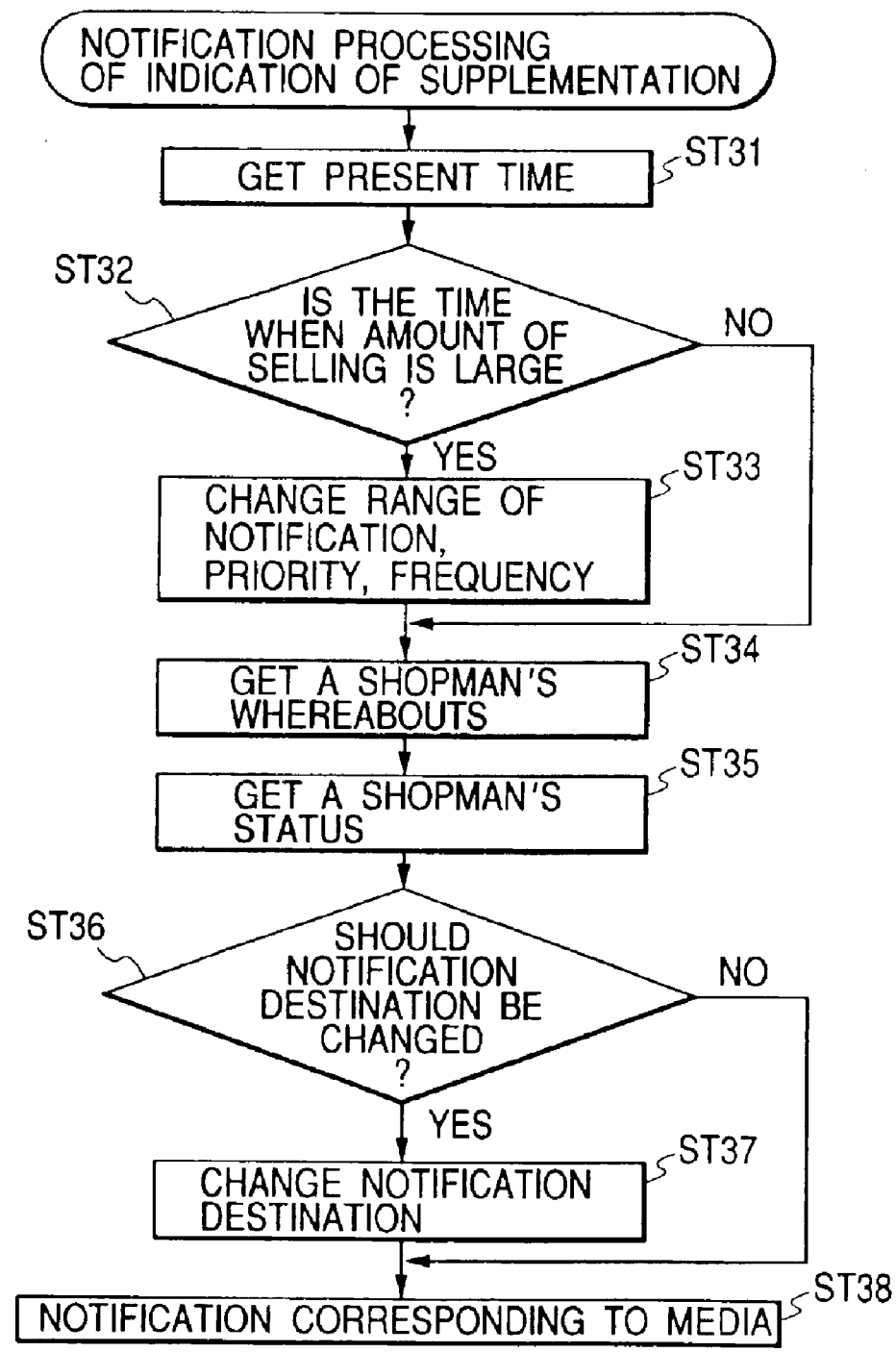
FIG. 8 is a flowchart describing notification of a salesperson of a commodity replenishment instruction which is performed by the inventory management system.

FIG. 8 describes a flow of issuing a replenishment instruction with the commodities 15 to a salesperson at the retail shop 1. First, a time instant is acquired at step ST31. It is then judged whether it is a time during which the sales volume of commodities 15 to be supplied for replenishment is large. For example, assuming that the commodities to be supplied for replenishment are packed lunches, it is regarded that the sales volume is large in the daytime and at night. If it is judged at step ST32 that the sales volume is large, control is passed to step ST33. A range of notification, a priority, and a frequency are changed at step ST33. For example, the number of salespersons to be instructed to replenish the showcase with commodities is increased. If the priority is ranked in seven levels, a priority given to notification may be raised by two levels. Moreover, if it is set that notification is performed at intervals of 30 minutes, the setting may be changed so that notification will be performed at intervals of 15 minutes.

Thereafter, control is passed to step ST34. If it is judged at step 32 that it is not the time during which the sales volume is large, control is passed to step ST34. The locations of salespersons are acquired at step ST34. For example, the salespersons may each be asked to wear a transmitter that originates identification information, and the locations of the salespersons may be acquired based on the identification information. The situations of the salespersons are acquired at step ST35. If a salesperson is manipulating a cash register, the salesperson is judged to be attending a shopper. At step ST36, it is judged from the information acquired at step ST34 and step ST35 whether a notification destination should be changed. For example, when the notification destination is a salesperson lying nearest the showcase 4 or warehouse 3 to be replenished with commodities, if the salesperson is attending a shopper, it is judged that the notification destination should be changed.

If it is judged at step ST36 that the notification destination should be changed, control is passed to step ST37. The notification destination is then changed at step ST37. For example, the notification destination is changed so that a salesperson watching the monitor of a monitoring camera will be notified. If all the commodities in the showcase are sold out, the showcase must be replenished immediately. In this case, all pieces of equipment located around a salesperson may be used to notify the salesperson. At step ST38, notification is performed according to a medium used to notify a salesperson of a replenishment instruction. For example, voice is used to notify a salesperson lying in a warehouse. Characters may be displayed on a monitoring monitor in order to notify a salesperson watching the monitor.

Figure 9:
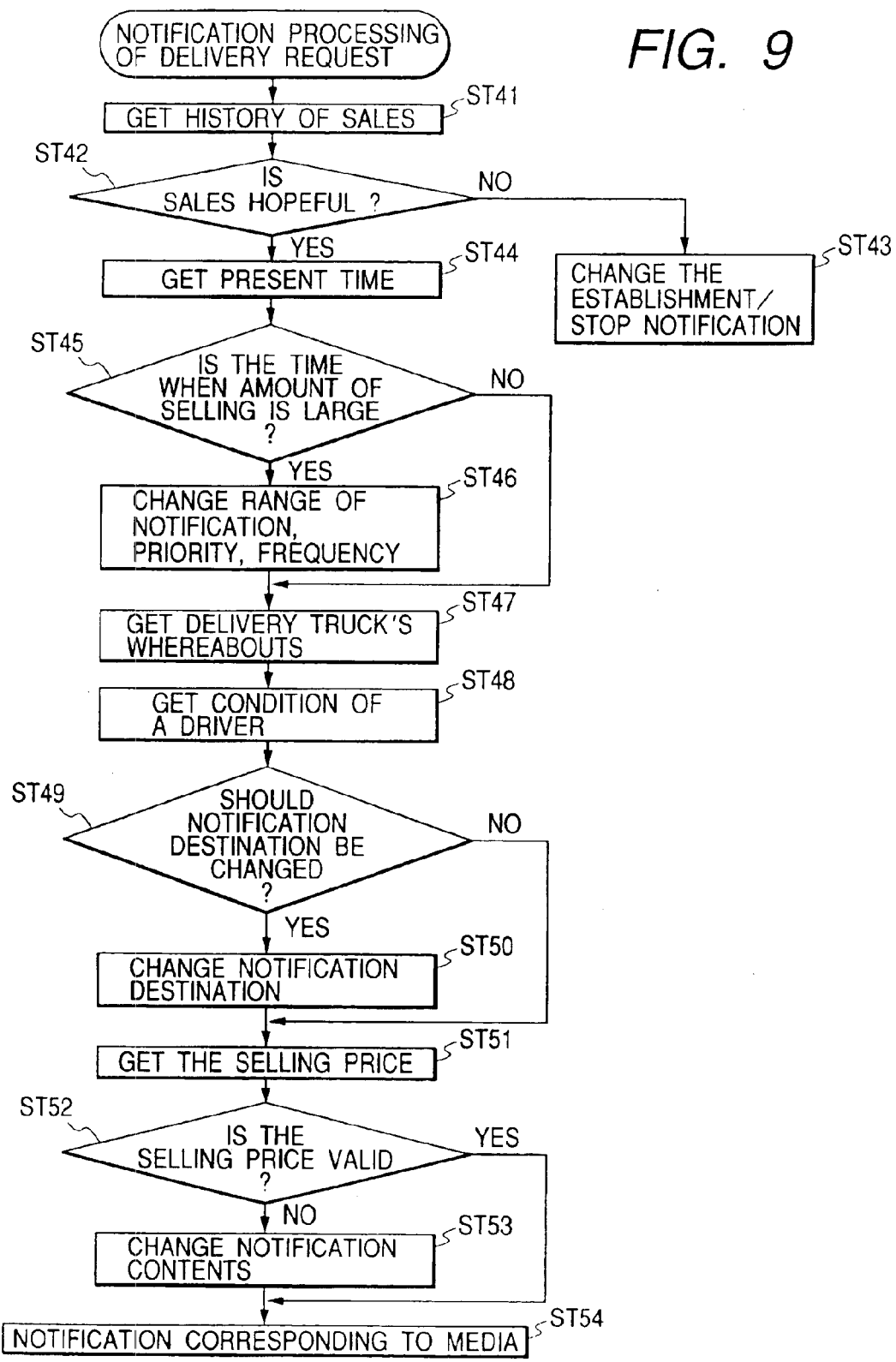
FIG. 9 is a flowchart describing notification of a delivery truck driver of a commodity delivery request which is performed by the inventory management system.

FIG. 9 describes a flow of issuing a commodity delivery request to a driver of the delivery truck 21 in this example. First, a sales history is acquired at step ST41. The sales history is extracted from the sales results 35 held in the IC tag 16. Control is then passed to step ST42. It is then judged whether good sales are expected. For example, if the sales results have been nil for one past week, it is judged that good sales are unexpected. Control is then passed to step ST43, and issuance is suspended. If the sales results have been three pieces for one past day, control is passed to step ST43. A criterion based on which a judgment is made at step ST22 is changed, and issuance is suspended. For example, if the criterion is such that the sales results are five pieces or more, the criterion is changed to be three pieces or more. If it is judged at step ST42 that good sales are expected, control is passed to step ST44. A time instant is acquired. It is then judged at step ST45 whether it is the time during which the sales volume of commodities 18 to be delivered is large.

For example, if the commodities 1B to be delivered are packed lunches, it is regarded that the sales volume is large in the daytime and at night. If it is judged at step ST45 that it is the time during which the sales volume is large, control is passed to step ST46. A range of notification, a priority, and a frequency are changed at step ST46. For example, when the range of notification is set to a circle whose radius is 3 km or less, if commodities are in urgent need, the setting may be changed to a circle whose radius is 1 km or less. In this case, a delivery request is issued to any of delivery trucks existent within the circle having the radius of 1 km or less. When the priority is ranked in seven levels, a priority given to notification of the delivery request may be raised by two levels. Moreover, when it is set that the delivery truck 21 should be notified of the delivery request from the equipment 20 at intervals of thirty minutes, the setting may be changed so that the delivery truck will be notified of the delivery request at intervals of fifteen minutes. After changing the setting is completed, control is passed to step ST47. If it is judged at step ST45 that it is not the time during which the sales volume is large, the above settings are not changed but control is passed to step ST47. The current location of the delivery truck 21 is acquired at step ST47. For example, a computer in a central management center may be inquired in order to acquire the current location of the delivery truck. The current location is thus acquired at step ST47, and the situation of the driver of the delivery truck 21 located within the range of notification is acquired at step ST48. For example, when the delivery truck is parked in a parking lot, the driver is regarded to be away from the delivery truck 21. When the delivery truck 21 is being moved, the driver is regarded to be driving the truck. Otherwise, when the delivery truck 21 is parked, the driver is regarded to be taking a rest. At step ST49, it is judged from the results of acquisition performed at step ST48 whether a notification destination should be changed. For example, when it is set that the driver of the nearest delivery truck 21 should be notified, if the driver of the nearest truck 21 is away from the delivery truck 21, it is judged that the notification destination should be changed. If it is judged at step ST49 that the notification destination should be changed, control is passed to step ST50. At step ST50, the notification destination is changed from the delivery truck 21 nearest to the retail shop 1, of which driver is away from the delivery truck 21, into the delivery truck 21 being driven towards the retail shop 1. Otherwise, when packed lunches are sold out at lunchtime, packed lunches must be urgently supplied for replenishment. In this case, all the trucks 21 located nearby may be notified. When changing the notification destination is completed at step ST50, control is passed to step ST51.

If it is judged at step ST49 that it is unnecessary to change the notification destination, control is passed to step ST51. A selling price is acquired at step ST51. The selling price is extracted from the price 32 held in the IC tag 16. If it is judged from the price 32 at step ST52 that a special sales is under way at the retail shop 1, the price 32 is regarded to be inappropriate as the selling price. Control is then passed to step ST53. At step ST53, the contents of notification are changed. For example, a message saying that the commodities 18 requested to be delivered are involved in the special sales is appended to the delivery request. Control is then passed to step ST54. If it is judged at step ST52 that the price is appropriate, control is passed to step ST54. Notification to be performed at step ST54 depends on a medium. For example, when a delivery truck is being driven, a display device included in a car navigation system is used to display characters meaning the delivery request. When a driver is taking a rest, a car audio player is used to sound an alarm. After the driver's attention is thus attracted, the display device of the car navigation system is used to display characters meaning the delivery request.

When a driver is away from the delivery truck 21, the driver's portable telephone, wristwatch, or the like is used to display characters meaning the delivery request.

THIRD EXAMPLE

Figure 10:
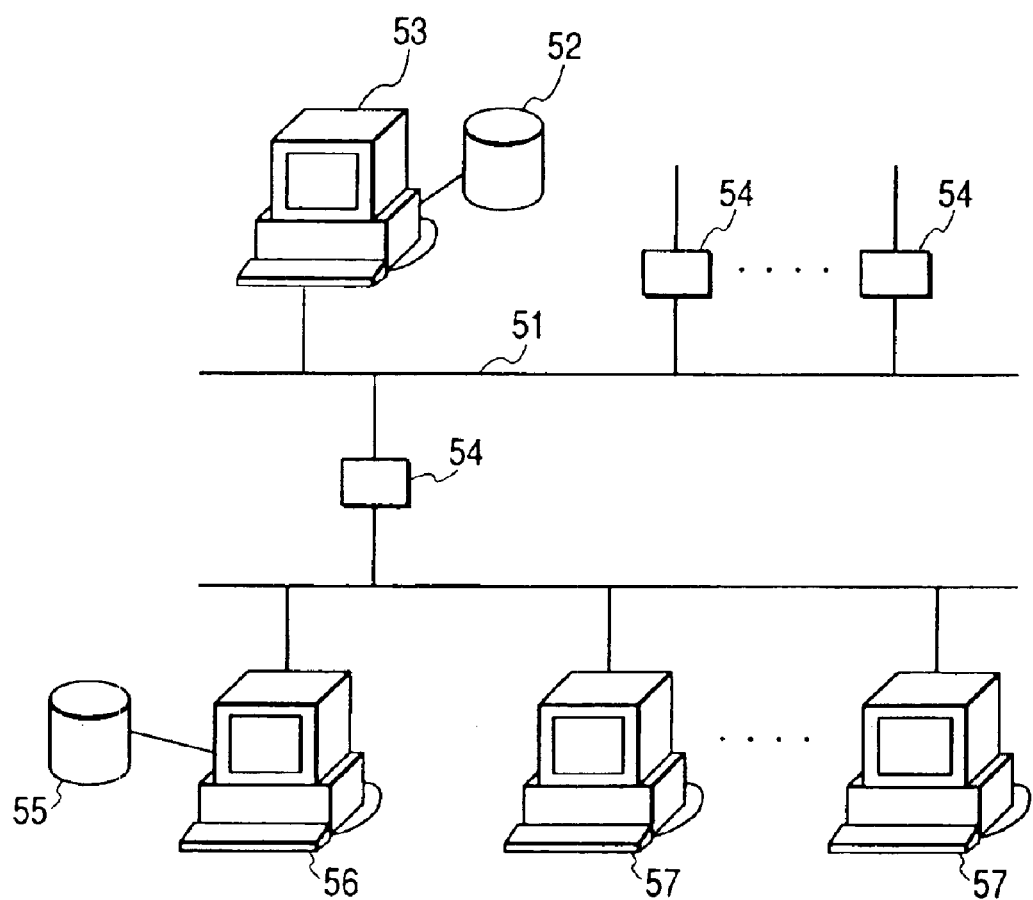
FIG. 10 schematically shows an example in which the adaptive communication method in accordance with the present invention is implemented in a design information management system.

FIG. 10 schematically shows an example in which the adaptive communication method in accordance with the present invention is implemented in a design information management system. Terminals or the like are connected over a transmission medium 51. The transmission medium 51 is, for example, the Ethernet. An acknowledged design document management database 52 contains acknowledged design documents. A server for managing the management database 52 is an acknowledged design document management server 53. The acknowledged design document management server 53 is connected onto a network via one or more routers 54. The network accommodates an unfinished design document management database 55 located at each design division and an unfinished design document management server 56 for managing the unfinished design document management database 55.

The unfinished design document management database 55 is used to manage unacknowledged design documents that are accessible in common within a design division. A plurality of user terminals 57 is connected over the transmission medium 51. A design document is created at the user terminal 57. An unfinished design document or the location of the unfinished design document is contained in the unfinished design document management database 55. Otherwise, the user terminal 57 may be used exclusively to notify a user of information, and may be realized with a portable terminal or a wristwatch-like terminal.

Figure 11:
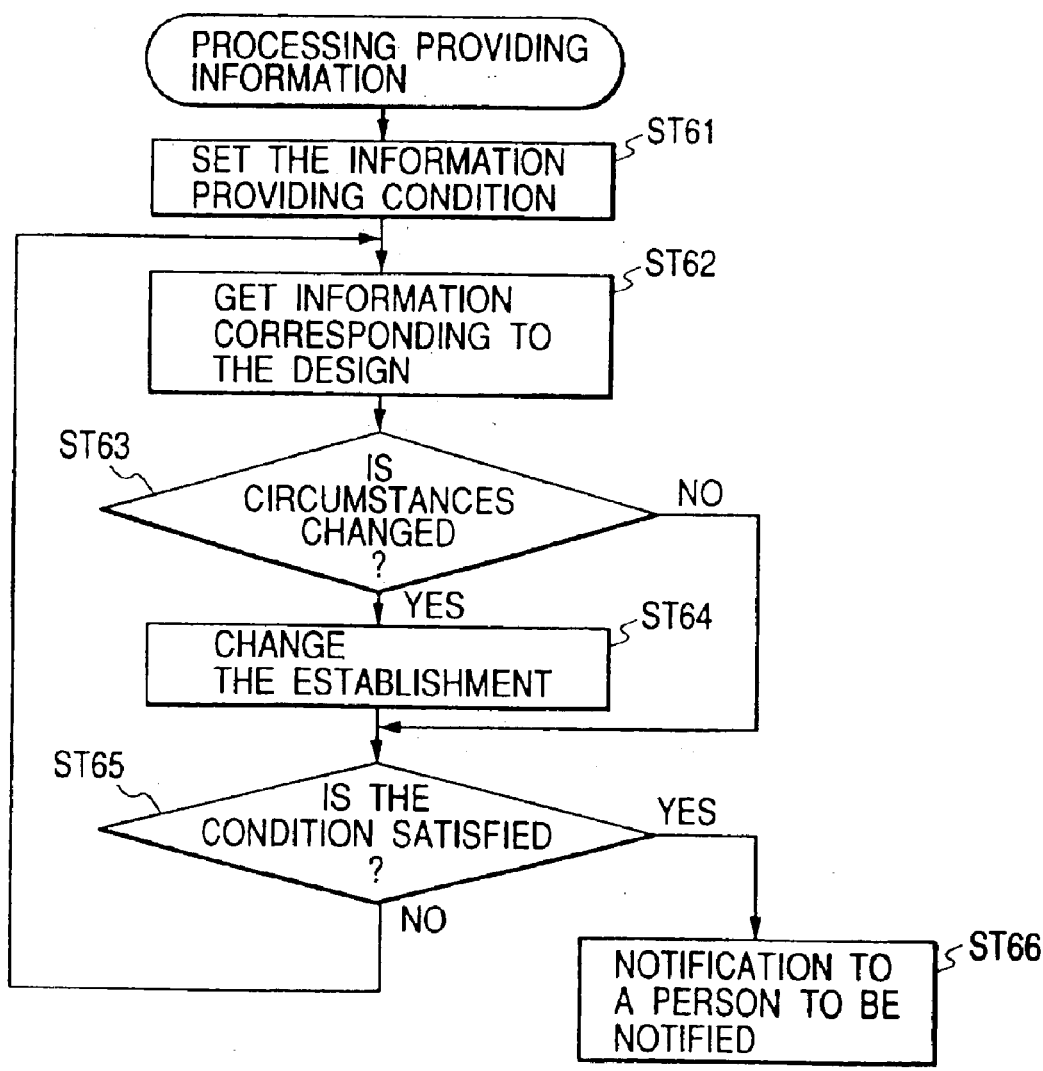
FIG. 11 is a flowchart describing information notification to be performed under a user-specified condition by the design information management system.

FIG. 11 describes a flow of design information provision included in the adaptive communication method in accordance with the present invention implemented in the design information management system. At step ST61, a user who wants to be notified of design information sets a condition. For example, the condition is set so that when a design drawing is changed, the fact will be notified. Alternatively, a system manager may set a condition for notification of design information. For example, the condition is set so that when a time lag is detected relative to predefined milestone information, notification will be performed. Based on the condition defined at step ST61, design-related information is acquired at step ST62. For example, when a document contained in the acknowledged design document management database 52 is changed, since the condition for notification is met, a version of the document is produced.

Figure 12:
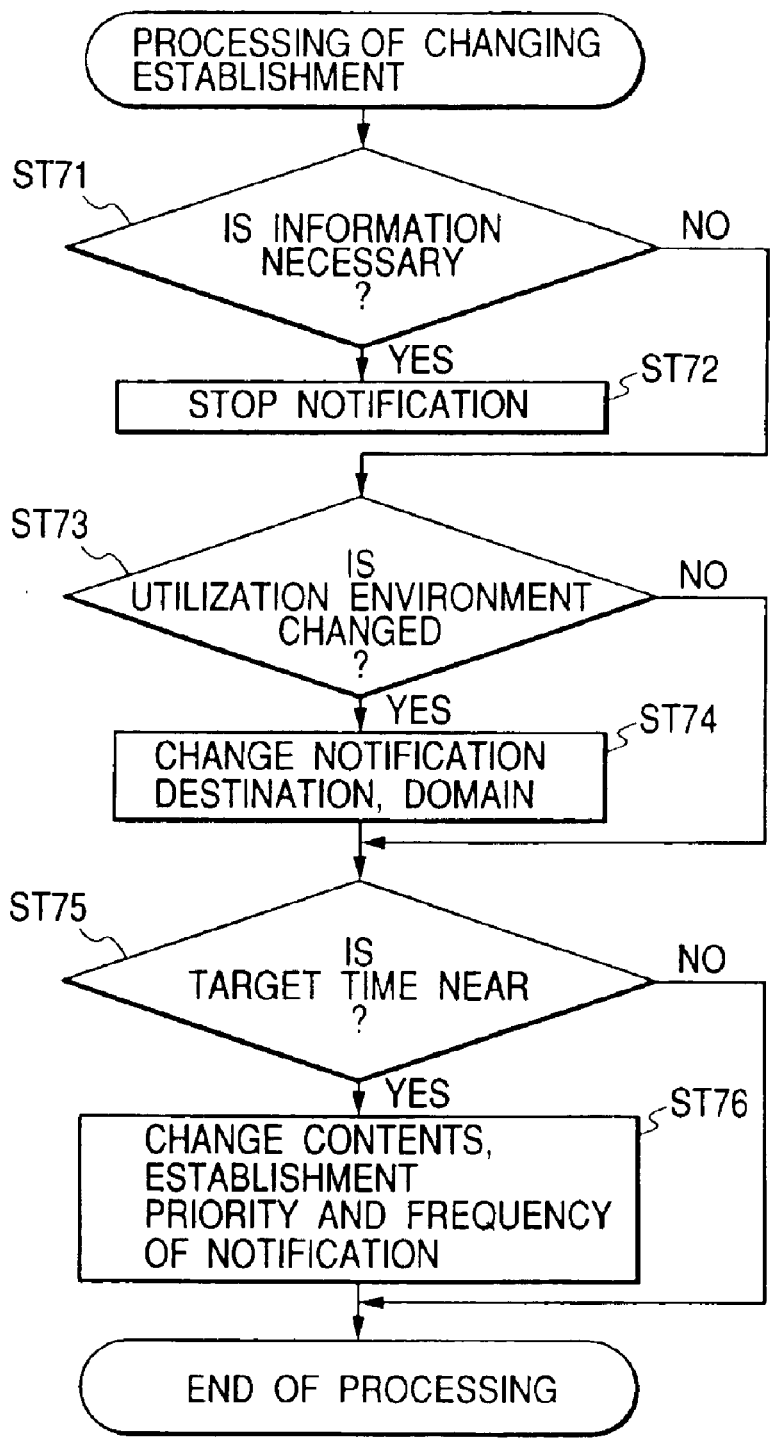
FIG. 12 is a flowchart describing changing of information notification according to design-related information which is performed by the design information management system.

Furthermore, time information such as a current date, equipment information of equipment constituting a network, and terminal information of a terminal at which a user has logged in are acquired. When the terminal at which the user has logged in is a portable terminal, ambient environment information indicating that the user stays indoors or outdoors is acquired if possible. It is judged at step ST63 whether the user's situation has changed. If the situation has changed, control is passed to step ST64. Settings are changed. FIG. 12 describes a detailed flow of changing settings. Control is then passed to step ST65. If it is judged at step ST64 that the situation has not been changed, control is passed to step ST65. It is judged at step ST65 whether information acquired at step ST62 meets the condition set at step ST61 or the condition changed at step ST64. For example, it is judged whether a version of a design document has been changed. If it is judged at step ST65 that the condition is not met, a standby state is retained for a certain period of time. Thereafter, control is returned to step ST62.

If it is judged at step ST65 that the condition is met, control is passed to step ST66. A notified person is then notified as described in FIG. 12. Changing settings at step ST64 will be described. First, for example, job assignment is changed at step ST71, and a job assigned to the notified person is changed. If the information acquired under the condition set at step ST61 becomes unnecessary, control is passed to step ST72. Information notification is then suspended, and control is passed to step ST73. If it is not judged at step ST71 that the information becomes unnecessary, control is passed to step ST73. It is then judged at step ST73 whether the user's use environment including a terminal employed and a use situation has been changed.

If it is judged at step ST73 that the use environment has been changed, control is passed to step ST74. A notification destination and a range of notification are changed at step ST74. When the terminal employed has been changed, the notification destination is changed. When the number of terminals employed has increased because the power supply of another portable terminal is turned on, the range of notification is changed. Moreover, notification will be performed in line with the terminals. Specifically, when a wristwatch-like terminal is employed outdoors, notification is performed using vibrations. When a personal computer or the like is employed indoors, notification is performed using an alarm sound and characters. Thereafter, control is passed to step ST75. If it is judged at step ST73 that the use environment has not been changed, control is passed to step ST75. It is judged at step ST75 whether a milestone is located nearby. If it is judged that no milestone is located nearby, the processing is terminated.

In contrast, if it is judged that a milestone is located nearby, control is passed to step ST76. If a milestone is located nearby, it is judged that all items of design information have been completed. Design information relevant to notified information is therefore notified together with the notified information at step ST76. A time lag relative to a milestone may be indicated using a drawing, while a change in a design document may be indicated using characters. When a milestone is located nearby, a priority given to processing and the frequency of notifying information are raised. For example, when the priority is ranked in seven levels, a priority of level 4 is raised to a priority of level 2. When the notification frequency is set so that notification will be performed with every sixth change, the setting may be changed so that notification will be performed with every change. This enables careful management. When a milestone is located nearby, it is judged that processing must be performed carefully. Normally, a change in a document contained in the acknowledged design document management database 52 is detected. In contrast, when a milestone is located nearby, a change in a document contained in the unfinished design document management database 55 or a change in data stored in the user terminal 57 capable of creating a design document is also detected.

Furthermore, when a milestone is located nearby, it is judged that the necessity of information notification is intensified. All terminals employed by a notified person may be used to notify the notified person.

What is claimed is:

1. An adaptive communication method for notifying information to a person to be notified of the information, which relates to a function of any of a plurality of equipment forming a distributed system of which each of the plurality of equipment is interconnected over a transmission medium and includes one or more arithmetic units, said adaptive communication method comprising the steps of:

a first step in which any of the plurality of equipment acquires environmental information indicating an environment in which the plurality of equipment is installed before the time when the information of the function is informed to the person;

a second step in which any of the plurality of equipment determines a notification method notifying the information to be notified to the person according to the environment information acquired by the first step and the contents of information to be notified before the time at when the information of the function is informed to the person; and a third step in which one of the plurality of equipment notifies the information to be notified to the person according to the notification method determined by the second step, wherein the environment information comprises an attention level at which the person is attracted attention and an attention objection, and wherein, when the attention level of the attention object is low, a control instruction is set to make the attention level of the attention object higher than the low attention level, as a part of the notification method.

2. An adaptive communication method for notifying information to a person to be notified of the information, which relates to a function of any of a plurality of equipment forming a distributed system of which each of the plurality of equipment is interconnected over a transmission medium and includes one or more arithmetic units, said adaptive communication method comprising the steps of:

a first step in which any of the plurality of equipment acquires environmental information indicating an environment in which the plurality of equipment is installed before the time when the information of the function is informed to the person;

a second step in which any of the plurality of equipment determines a notification method notifying the information to be notified to the person according to the environment information acquired by the first step and the contents of information to be notified before the time at when the information of the function is informed to the person; and a third step in which one of the plurality of equipment notifies the information to be notified to the person according to the notification method determined by the second step, wherein the notification method comprises at least one of changing a condition for notification to the person according to the environment information, changing the contents of information, changing the apparatus used to notify information, changing a range of information notification, changing a priority given to information notification, and splitting the contents of notified information is carried out in order to determine the notification method.

3. Equipment used in a distributed system, having a plurality of equipment being interconnected over a transmission medium and including one or more arithmetic units and that notifies predetermined information, comprising:

a means for acquiring environment information indicating an environment in which the plurality of equipment are installed, by a sensor or other equipment if necessary; and a means for determining a notification method notifying an information to be notified a person of the information according to the acquired environment information and contents of the information to be notified, wherein the environment information comprises an attention level at which the person is attracted attention and an attention objection, and wherein, at least one of the equipment comprises means for setting control instruction to make the attention level of the attention object higher when the attention level of the attention object is low.

4. Equipment used in a distributed system, having a plurality of equipment being interconnected over a transmission medium and including one or more arithmetic units and that notifies predetermined information, comprising:

a means for acquiring environment information indicating an environment in which the plurality of equipment are installed, by a sensor or other equipment if necessary; and a means for determining a notification method notifying an information to be notified a person of the information according to the acquired environment information and the contents of the information to be notified, wherein the means for determining the notification method carries out at least one of changing a condition for notification to the person according to the environment information, changing the contents of information, changing the apparatus used to notify information, changing a range of information notification, changing a priority given to information notification, changing the frequency of information notification, and splitting the contents of notified information is carried out in order to determine the notification method.

5. A distributed system having a plurality of equipment, each of which is interconnected over transmission medium and includes one or more arithmetic units, and notifying predetermined information, wherein at least one of the plurality of equipment comprises:

a means for acquiring environment information indicating an environment in which the plurality of equipment are installed before the time when the information is notified; and a means for determining a notification method notifying an information to be notified to the person of the information according to the acquired environment information and the contents of information to be notified before the time at when the information of the function is informed to the person, and wherein the environment information comprises an attention level at which the person is attracted attention and an attention objection, and wherein, at least one of the equipment comprises means for setting control instruction to make the attention level of the attention object higher than the attention level, when the attention level of the attention object is low.

6. Equipment forming a distributed system, having a plurality of equipment being interconnected over a transmission medium and including one or more arithmetic units and that notifies predetermined information, comprising:

a memory in which programs are stored; and a processor to perform the programs for acquiring environment information indicating an environment of the plurality of equipment before the time instant at which the information is notified to the person, and for determining a notification method notifying the information to the person to be notified of the information according to the acquired environment information and the contents of the information to be notified, wherein said processor carries out at least one of changing a condition for notification of the person of the information according to the environment information, changing the contents of information, changing the apparatus used to notify information, changing a range of information notification, changing the frequency of information notification, and splitting the contents of notified information.

* * * * *